Sept. 19, 1967 W. J. SMYTHE ETAL 3,342,063
BLOOD-VISCOSITY MEASURING APPARATUS
Filed Feb. 23, 1965
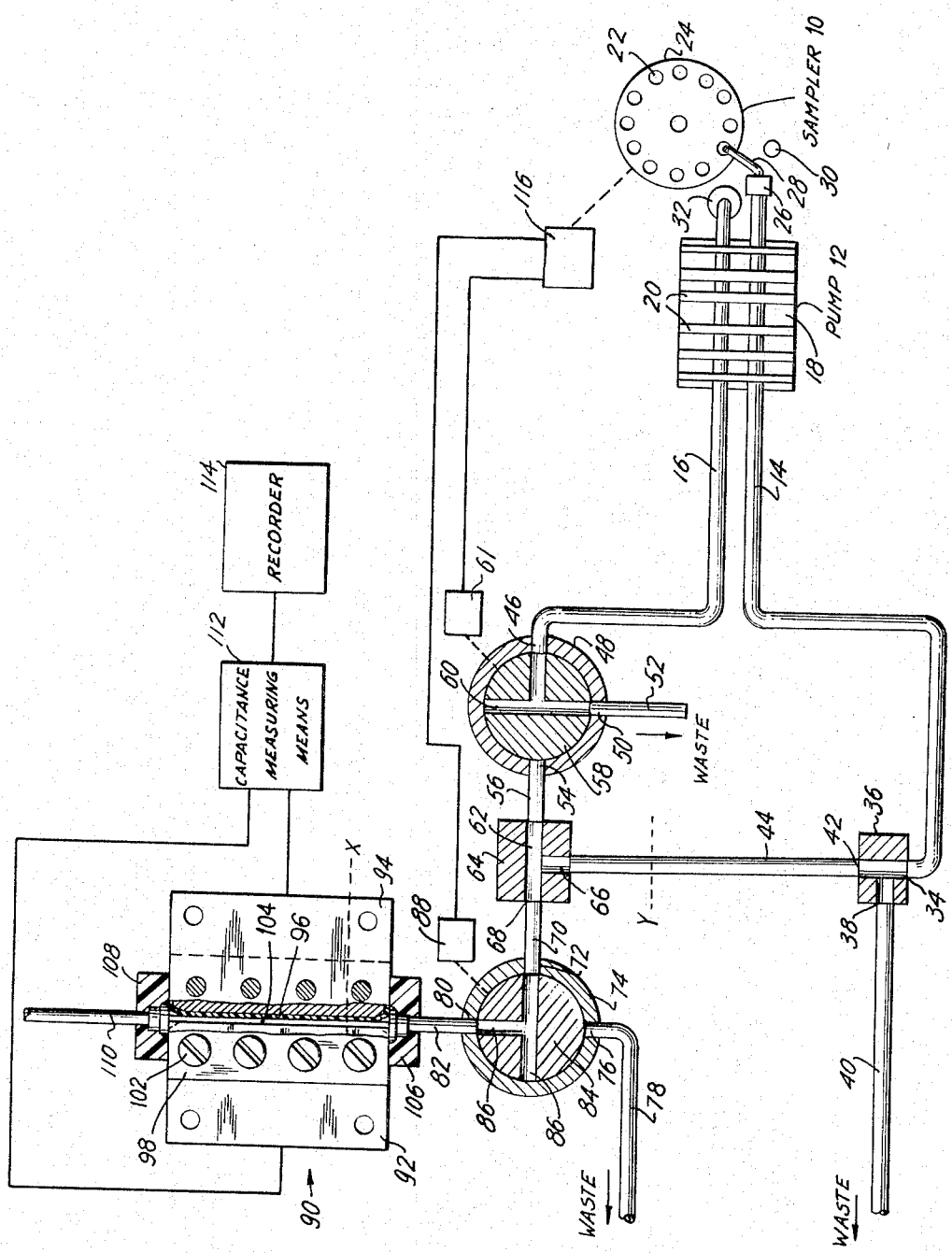
INVENTORS
WILLIAM J. SMYTHE
MORRIS H. SHAMOS
BY
ATTORNEY

United States Patent Office 3,342,063
Patented Sept. 19, 1967

3,342,063
BLOOD-VISCOSITY MEASURING APPARATUS
William J. Smythe, Rye, and Morris H. Shamos, New York, N.Y., assignors to Technicon Instruments Corporation, Chauncey, N.Y., a corporation of New York
Filed Feb. 23, 1965, Ser. No. 434,714
12 Claims. (Cl. 73—55)

ABSTRACT OF THE DISCLOSURE

A system for measuring the viscosity of a plurality of first fluid samples, comprising a first conduit having a constriction therein, a second conduit coupled to and between the first conduit upstream of the constriction and a pressure measuring means, means for intermittently and successively transmitting the samples through the first conduit and for transmitting a second liquid through the second conduit, and means for intermittently trapping a quantity of the second liquid in the second conduit whereby the pressure developed in the first conduit by a sample is communicated through the second conduit by the trapped second liquid to the pressure measuring means.

---

This invention relates to viscosity measuring apparatus, and, more particularly, to an apparatus for measuring the viscosity of blood.

The hemacrit, or red blood cell volume, is one of the determinations used by physicians to characterize anemias. It has been customary to determine the average red blood cell volume in blood by firstly counting the number of cells in a unit volume of blood, and secondly, centrifuging a known volume of blood and measuring the total volume of the grouped together red blood cells. This is a very laborious and time consuming process which is performed on each sample, one at a time, manually.

It is, therefore, an object of this invention to provide an apparatus for automatically measuring the average red blood cell volume of each of a plurality of samples.

It has been suggested that the viscosity of red blood is a function of the volumes of the individual red cells, or the average cell volume, and of the number of cells in a unit volume of blood. When the number of cells per unit volume is known, the viscosity is a function of average cell volume. When the samples are provided as successive portions of a flowing fluid stream, the apparatus shown by Jack Isreeli and Theodore Bilichniansky in U.S. Patent No. 3,165,693, granted Jan. 12, 1965, may be advantageously utilized to count the number of cells in each of the samples.

It is another object, therefore, to provide an apparatus for automatically measuring the viscosity of a flowing fluid stream.

It is yet another object to provide an apparatus for automatically measuring the viscosity of a plurality of fluid samples supplied seriatim as a continuous fluid stream.

It is still another object to provide an apparatus for automatically measuring and recording the viscosity of a plurality of red blood samples supplied seriatim as a continuous fluid stream.

A feature of this invention is the provision of a conduit; a constriction in said conduit; means for positively displacing a fluid sample through said conduit and said constriction therein; and means coupled to said conduit between said constriction and said positive displacement means for measuring the pressure developed in said conduit upstream of said constriction.

These and other objects, features and advantages of the invention will become apparent from the following description thereof taken in conjunction with the accompanying drawing, in which:

The figure is a diagrammatic plan of an apparatus embodying this invention.

In the drawing, the samples of red blood are sequentially supplied to the apparatus by a sampler 10 and a peristaltic type pump 12. The sampler 10 may advantageously be of the type shown in the patent to DeJong, U.S. 3,134,263, granted May 26, 1964. The pump may advantageously be of the type shown in the patent to Ferrari, Jr. and Isreeli, U.S. 2,935,028, granted May 3, 1960. The pump includes a plurality of resiliently flexible tubes 14 and 16 which are progressively compressed along their length between a platen 18 and a plurality of rollers 20 carried between endless chains. The sampler includes a plurality of open topped sample containers 22 which are supported in a turntable 24. An offtake mechanism 26 operates an offtake tube 28. One end of the offtake tube is coupled to the upstream end of the pump tube 14, and the other end is alternately disposed within an adjacent sample container 22 and a container 30 of wash liquid. The operation of the pump on the pump tube 14 causes the offtake tube to aspirate fluid up through the tube 28 and into the tube 14. The sampler intermittently rotates the turntable to sequentially present each sample container to the offtake tube. The offtake mechanism is coupled to the turntable to cause the offtake tube to initially enter the first sample container, and to aspirate a volume of sample; to withdraw and to swing towards the wash container 30 and to aspirate a volume of air; to enter the wash container and to aspirate a volume of wash liquid; to withdraw and to swing towards the next sample container which has been presented to the offtake mechanism, and to aspirate a volume of air; to enter the next sample container, and so on. The other pump tube 16 has its upstream end disposed in a container 32 of a second liquid, such as water. The operation of the pump on the pump tube 16 causes it to continuously aspirate the second liquid into the tube 16.

The downstream end of the pump tube 14 is coupled to one leg 34 of a first three-legged junction 36. The second leg 38 is coupled to one end of a conduit 40 of relatively smaller internal diameter than the tube 14 and serves as a constriction in the conduit provided by the tubes 14 and the conduit 40. The other end of the conduit 40 leads to a waste sump, not shown. The third leg 42 of the junction 36 is coupled to a vertical conduit 44.

The downstream end of the pump tube 16 is coupled to an inlet 46 of a first three port valve 48. An outlet 50 of the valve is coupled to a conduit 52 whose other end leads to a waste sump, not shown. An outlet 54 of the valve is coupled to a conduit 56. The valve includes a stem 58 having a T-shaped passageway 60 therethrough. The stem is coupled to a rotary solenoid 61 for 90° counterclockwise rotation from the position shown.

The conduit 56 is coupled to one leg 62 of a second three-legged junction 64. The second leg 66 is coupled to the other end of the vertical conduit 44. The third leg 68 is coupled to one end of conduit 70.

The other end of the conduit 70 is coupled to an inlet 72 of a second three port valve 74. An outlet 76 of the valve is coupled to a conduit 78 whose other end leads to a waste sump, not shown. An outlet 80 is coupled to one end of a vertical conduit 82. The valve includes a stem 84 having a T-shaped passageway 86 therethrough. The stem is coupled to a rotary solenoid 88 for 90° counterclockwise rotation from the position shown.

The upper end of the conduit 82 is coupled to a liquid level detector 90, which may be of the capacitance type such as is shown in the U.S. patent application of Nelson G. Kling, S.N. 433,347, filed Feb. 17, 1965, and assigned to the assignee of this application. Briefly, the detector comprises a pair of metal plates 92 and 94 which are coated with a film 96 of a non-wetting plastic, and are held in edge-spaced-apart relation by a pair of plastic plates 98 and bolts 102 to form a central passageway 104. A lower mounting plate 106 couples the upper end of the conduit 82 to the lower end of the passageway 104. An upper mounting plate 108 couples the upper end of the passageway 104 to the lower end of a conduit 110. The upper end of the conduit 110 is closed, to form an air chamber. The metal plates 92 and 94 form a capacitor whose capacitance varies as a function of the dielectric in the passageway 104. The capacitor 90 is coupled to a capacitance measuring circuit 112, such as a capacitance bridge. A recorder 114 is coupled to the measuring circuit 112 to record the output signal therefrom.

It will be appreciated that other liquid level detection means, such as resistance measuring means, may be utilized in lieu of the capacitance measuring means hereinabove discussed.

The solenoids 62 and 68 are actuated by a programmer 116 which is synchronized to the rotation of the turntable 24.

In operation, the system is initially in the wash condition wherein the valve stems 58 and 84 are rotated by their rotary solenoids 61 and 88 respectively to their counterclockwise positions. The offtake tube 28 is disposed in the wash liquid container 30 and is aspirating wash liquid through the pump tube 14, through the first junction 36, through the conduit 40, and out to the waste sump. The second liquid container 32 is providing second liquid through the pump tube 16, the valve inlet 46, the valve passageway 60, the valve outlet 54, the conduit 56, the second junction 64, the conduit 44, the first junction 36, the conduit 40 and out to the waste sump. There is a certain amount of a gas, such as air, trapped in the conduit 110, and a quantity of second liquid in the passageway 104. Some of the second fluid flows out of the passageway 104, through the conduit 82, the valve inlet 80, the valve passageway 86, the valve outlet 76, the conduit 78, and out to the waste sump. Atmospheric pressure precludes the outflow of all of the second fluid from the passageway 104 and the fall of the level of the second fluid in the passageway 104 stops at what shall be considered a base level X.

Subsequently, the turntable presents a sample container 22 to the offtake mechanism 26, which disposes the offtake tube therein, aspirating the sample fluid contained therein through the pump tube 14, the junction 36, the conduit 40, and out to the waste sump. The sample fluid also rises up in the conduit 44. Concurrently, the rotary solenoids 61 and 88 are actuated by the programmer 116 to rotate their respective valve stems to their clockwise positions. The flow of the second liquid from the container 32 passes through the pump tube 16, the valve inlet 46, the valve passageway 60, the valve outlet 40, the conduit 52, out to the waste sump. A quantity of second fluid remains trapped in the closed system including the capacitor passageway 104, the conduit 82, the valve inlet 80, the valve passageway 86, the valve inlet 72, the conduit 70, the junction 64, the conduit 56, and tends to flow down through the conduit 44. However, the sample fluid from the sample container 22 being aspirated is tending to flow up through the conduit 44. The pressure that the sample fluid applies upwardly in the conduit 44 is a function of the viscosity of the sample fluid. This pressure forces the second fluid upwardly in the conduit 44 and upwardly in the capacitor passageway 104. The volumes of trapped gas and second fluid disposed in the capacitor passageway determine the capacitance of the capacitor. The meanuring circuit 112 measures the capacitance of the capacitor, which is a measure of the height of the second fluid in the passageway. The height of the second fluid is a measure of the pressure from the sample fluid. Thus the capacitance of the capacitor is responsive to the viscosity of the sample fluid. The recorder 114 advantageously records the output signal from the measuring circuit 112 as a direct value of viscosity of the measured sample fluid.

Finally, the offtake mechanism withdraws the offtake tube 28 from the sample container and disposes it in the wash liquid container 30, to wash out the pump tube 14. Concurrently the rotary solenoids are actuated by the programmer 116 to rotate the valve stems to their counterclockwise wash positions previously described.

Eventually the turntable presents the next sample container to the offtake mechanism, and the measuring cycle is repeated, as previously described on this next sample fluid. The constants of the system are chosen so that the level Y of the sample fluid never reaches the second junction 64 to contaminate the conduit 70 or the control passageway 104. The second fluid is chosen for its ability not to leave a precipitate or coating in the passageway 104.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for measuring the viscosity of a first fluid comprising: a first conduit; a constriction at one end of said first conduit; first supply means for supplying and positively displacing the first fluid through said first conduit and said constriction coupled to the other end of said first conduit; a second, substantially vertical conduit; the lower end of said second conduit being coupled in fluid-flow communication with said first conduit between said constriction and said first supply means; a three-legged tubular junction having one leg coupled to the upper end of said second conduit; a first three-port valve having a first port coupled to the second leg of said three-legged junction, and the second port coupled to a waste sump; second supply means for transmitting a second fluid to said second conduit coupled to the third port of said first three-port valve; said first valve having a stem and a passageway for alternatively intercoupling said first and third ports, and said second and third ports; a second three-port valve having a first port coupled to the third leg of said three-legged junction, and the second port coupled to a waste sump; a third, substantially vertical conduit having a closed upper end and a lower end coupled to the third port of said second valve, and a quantity of gas trapped within its upper portion; said second valve having a stem and a passageway for alternatively intercoupling said second and third ports, and said first and third ports; operating means coupled to said first and second valve stems for (1) initially positioning said first valve stem to intercouple said first and third ports of said first valve, and said second valve stem to intercouple said second and third ports of said second valve, whereby said second fluid is transmitted by said second supply means into said first valve third port, out of said first valve first port, through said three-legged junction, through said second conduit, into said first conduit and out said constriction, and (2) subsequently positioning said first valve stem to intercouple said second and third ports of said first valve, and said second valve stem to intercouple said first and third ports of said second valve, whereby said second fluid is transmitted by said second supply means into said first valve first port, and out of said first valve second port to said waste sump, a quantity of said second fluid is trapped in said second conduit and said third conduit, and the first fluid in said first conduit rises upwardly in said second conduit, displacing said trapped second fluid upwardly in said second and third conduits; and means for measuring the upward displacement of said trapped second fluid in said third conduit by the first fluid against said trapped quantity of gas.

2. Apparatus for measuring the viscosity of a first fluid comprising: a first conduit; a constriction at one end of said first conduit; first supply means for supplying and positively displacing the first fluid through said first conduit and said constriction coupled to the other end of said first conduit; a second, substantially vertical conduit; the lower end of said second conduit being coupled in fluid-flow communication with said first conduit between said constriction and said first supply means; a three-legged tubular junction having one leg coupled to the upper end of said conduit; a first three-port valve having one port coupled to the second leg of said three-legged junction, and the second port coupled to a waste sump; second supply means for transmitting a second fluid to said second conduit coupled to the third port of said first three-port valve; said first valve having a stem and a passageway for alternatively intercoupling said first and third ports, and said second and third ports; a second three-port valve having one port coupled to the third leg of said three-legged junction, and the second port coupled to a waste sump; a third, substantially vertical conduit having a closed upper end and a lower end coupled to the third port of said second valve, and a quantity of gas trapped within its upper portion; said second valve having a stem and a passageway for alternatively intercoupling said second and third ports, and said first and third ports; operating means coupled to said first and second valve stems for (1) initially positioning said first valve stem to intercouple said first and third ports of said first valve, and said second valve stem to intercouple said second and third ports of said second valve, whereby said second fluid is transmitted by said second supply means into said first valve third port, out said first valve first port, through said three-legged junction, through said second conduit, into said first conduit and out said constriction, and (2) subsequently positioning said first valve stem to intercouple said second and third ports of said first valve, and said second valve stem to intercouple said first third ports of said second valve, whereby said second fluid is transmitted by said second supply means into said first valve first port, and out said first valve second port to said waste sump, a quantity of said second fluid is trapped in said second conduit and said third conduit, and the first fluid in said first conduit rises upwardly in said second conduit, displacing said trapped second fluid upwardly in said second and third conduits; two metal plates disposed one on each side, respectively, of said third conduit to form a capacitor whose dielectric is varied by the upward displacement of said trapped second fluid in said third conduit by the first fluid against said trapped quantity of gas; and means for measuring the capacitance of said capacitor.

3. Apparatus for measuring the viscosity of a plurality of first fluid samples, comprising: a first conduit; a constriction at one end of said first conduit; a first supply means for supplying and positively displacing the first fluid samples seriatim through said first conduit and said constriction coupled to the other end of said first conduit; a second, substantially vertical conduit; the lower end of said second conduit being coupled in fluid-flow communication with said first conduit between said constriction and said first supply means; a three-legged tubular junction having one leg coupled to the upper end of said second conduit; a first three-port valve having a first port coupled to the second leg of said three-legged junction, and the second port coupled to a waste sump; second supply means for transmitting a second fluid to said second conduit coupled to the third port of said first three-port valve; said first valve having a stem and a passageway for alternatively intercoupling said first and third ports, and said second and third ports; a second three-port valve having a first port coupled to the third leg of said three-legged junction, and the second port coupled to a waste sump; a third, substantially vertical conduit having a closed upper end and a lower end coupled to the third port of said second valve, and a quantity of gas trapped within its upper portion; said second valve having a stem and a passageway for alternatively intercoupling said second and third ports, and said first and third ports; operating means coupled to said first and second valve stems for between successive first fluid samples (1) initially positioning said first valve stem to intercouple said first and third ports of said first valve, and said second valve stem to intercouple said second and third ports of said second valve, whereby said second fluid is transmitted by said second supply means into said first valve third port, out said first valve first port, through said three-legged junction, through said second conduit, into said first conduit and out said constriction, and (2) subsequently positioning said first valve stem to intercouple said second and third ports of said first valve, and said second valve stem to intercouple said first and third ports of said second valve, whereby said second fluid is transmitted by said second supply means into said first valve first port, and out said first valve second port to said waste sump, a quantity of said second fluid is trapped in said second conduit and said third conduit, and the first fluid sample in said first conduit rises upwardly in said second conduit, displacing said trapped second fluid upwardly in said second and third conduits; and means for measuring the upward displacement of said trapped second fluid in said third conduit by the first fluid against said trapped quantity of gas.

4. Apparatus for measuring the viscosity of a plurality of first fluid samples, comprising: a first conduit; a constriction at one end of said first conduit; first supply means for supplying and positively displacing the first fluid samples seriatim through said first conduit and said constriction coupled to the other end of first conduit; a second, substantially vertical conduit; the lower end of said second conduit being coupled in fluid-flow communication with said first conduit between said constriction and said first supply means; a three-legged tubular junction having one leg coupled to the upper end of said second conduit; a first three-port valve having a first port coupled to the second leg of said three-legged junction, and the second port coupled to a waste sump; second supply means for transmitting a second fluid to said second conduit coupled to the third port of said first three-port valve; said first valve having a stem and a passageway for alternatively intercoupling said first and third ports, and said second and third ports; a second three-port valve having a first port coupled to the third leg of said three-legged junction, and the second port coupled to a waste sump; a third, substantially vertical conduit having a closed upper end and a lower end coupled to the third port of said second valve, and a quantity of gas trapped within its upper portion; said second valve having a stem and a passageway for alternatively intercoupling said second and third ports, and said first and third ports; operating means coupled to said first and second valve stems for between successive first fluid samples (1) initially positioning said first valve stem to intercouple said first and third ports of said first valve, and said second valve stem to intercouple said second and third ports of said second valve, whereby said second fluid is transmitted by said second supply means into said first valve third port, out said first valve first port, through said three-legged junction, through said second conduit, into said first conduit and out said constriction, and (2) subsequently positioning said first valve stem to intercouple said second and third ports of said first valve, and said second valve stem to intercouple said first and third ports of said second valve, whereby said second fluid is transmitted by said second supply means into said first valve first port, and out said first valve second port to said waste sump, a quantity of said second fluid is trapped in said second conduit and said third conduit, and the first fluid sample in said first conduit rises upwardly in said second conduit, displacing said trapped second fluid upwardly in said second and third conduits; two metal plates disposed one on each side, respectively, of said third conduit to form a capacitor whose dielectric is varied by the upward displacement of said trapped second fluid in said third conduit by the first fluid against said trapped quantity of gas; and means for measuring the capacitance of said capacitor.

5. Apparatus for intermittently measuring the viscosity of a sample liquid stream comprising:
  a first conduit having an upstream end, a downstream end, and an intermediate portion;
  first source means coupled to said upstream end of said first conduit for supplying and for transmitting the sample liquid through said first conduit;
  a constriction disposed in said first conduit adjacent said downstream end;
  a second conduit having an upstream end, a closed downstream end, and an intermediate portion;
  a third conduit coupled to and between said intermediate portion of said first conduit and said intermediate portion of said second conduit;
  a second source means for supplying and for transmitting a second liquid through said second conduit;
  first valve means having first and second alternative dispositions, said first disposition coupling said second source means to said upstream end of said second conduit, and said second disposition closing said upstream end of said second conduit;
  programming means coupled to said first valve means for intermittently actuating said first valve means to and between said first and second dispositions thereof; and
  pressure responsive means coupled to said intermediate portion of said second conduit when said first valve means is in its second disposition;
  whereby when said first valve means is in its first disposition, said second liquid flows in said second conduit and out through said third conduit, and when said first valve means is in its second disposition, a quantity of second liquid is trapped in said second conduit and communicates back pressure developed by said first liquid in said first conduit to said pressure responsive means.

6. Apparatus according to claim 5 wherein said pressure responsive means is fluid operated; and further including second valve means having first and second alternative dispositions, said first disposition closing said downstream end of said second conduit, said second disposition coupling said downstream end of said second conduit to said pressure responsive means;
  said programming means being coupled to said second valve means and actuating said second valve means to said second disposition thereof when said first valve means is at its second disposition thereof.

7. Apparatus according to claim 6 wherein:
  said second valve means in said first disposition thereof couples said pressure responsive means to waste.

8. Apparatus according to claim 5 wherein said first source means intermittently, successively transmits independent and unique sample liquids through said first conduit;
  said programming means normally maintaining said first valve means in said first disposition thereof, and at least once for each independent sample liquid, actuating said first valve means to said second disposition thereof.

9. Apparatus according to claim 8 wherein said programming means actuates said first valve means to said first disposition thereof before, and at least until, said first source means transmits the next successive independent sample liquid.

10. Apparatus for intermittently measuring the viscosity of a sample liquid stream comprising:
  a first conduit having a source of sample liquid coupled to its upstream end and a constriction in its downstream end;
  liquid operated pressure responsive means;
  intermediate conduit means for coupling said first conduit, upstream of said constriction, to said pressure responsive means, whereby sample liquid flows into said intermediate conduit means from said first conduit;
  wash liquid supply means intermittently coupled by intermittently opened valve means to said intermediate conduit means for intermittently transmitting wash liquid through said intermediate conduit means in a direction opposite to the flow of said sample liquid therein, and at least coextensive therewith, whereby wash liquid flows through said intermediate conduit means and out into said first conduit.

11. Apparatus according to claim 10 wherein said source of sample liquid intermittently and successively transmits independent and unique sample liquids through said first conduit; and
  programming means coupled to said source of sample liquid and said wash liquid supply means for actuating said wash liquid supply means to transmit wash liquid through said intermediate conduit means between transmissions of successive sample liquids by said source of sample liquid.

12. A method of measuring the viscosity of a plurality of liquid samples comprising:
  positively displacing the liquid samples successively through a first conduit having a constriction therein;
  intermittently coupling a liquid operative pressure responsive means to said first conduit via a second conduit;
  intermittently flowing a liquid sample into said second conduit in a first direction of flow;
  intermittently washing out said second conduit with a wash liquid with a flow in a second direction which is opposite to said first direction of flow between samples and subsequently trapping a quantity of wash liquid in said second conduit to couple the pressure developed by the next successive sample liquid in said first conduit to said pressure responsive means.

References Cited

UNITED STATES PATENTS

| | | | |
|---|---|---|---|
| 785,438 | 3/1905 | Sargent | 73—401 |
| 1,604,672 | 10/1926 | Albersheim et al. | 73—55 |
| 2,459,483 | 1/1949 | Zimmer et al. | 73—55 |
| 2,944,199 | 7/1960 | Hudson | 73—398 X |
| 3,134,263 | 5/1964 | De Jong | 73—423 |

DAVID SCHONBERG, *Primary Examiner.*